No. 626,756. Patented June 13, 1899.
R. H. HENNEMEIER.
BICYCLE.
(Application filed Sept. 17, 1898.)
(No Model.) 2 Sheets—Sheet 1.
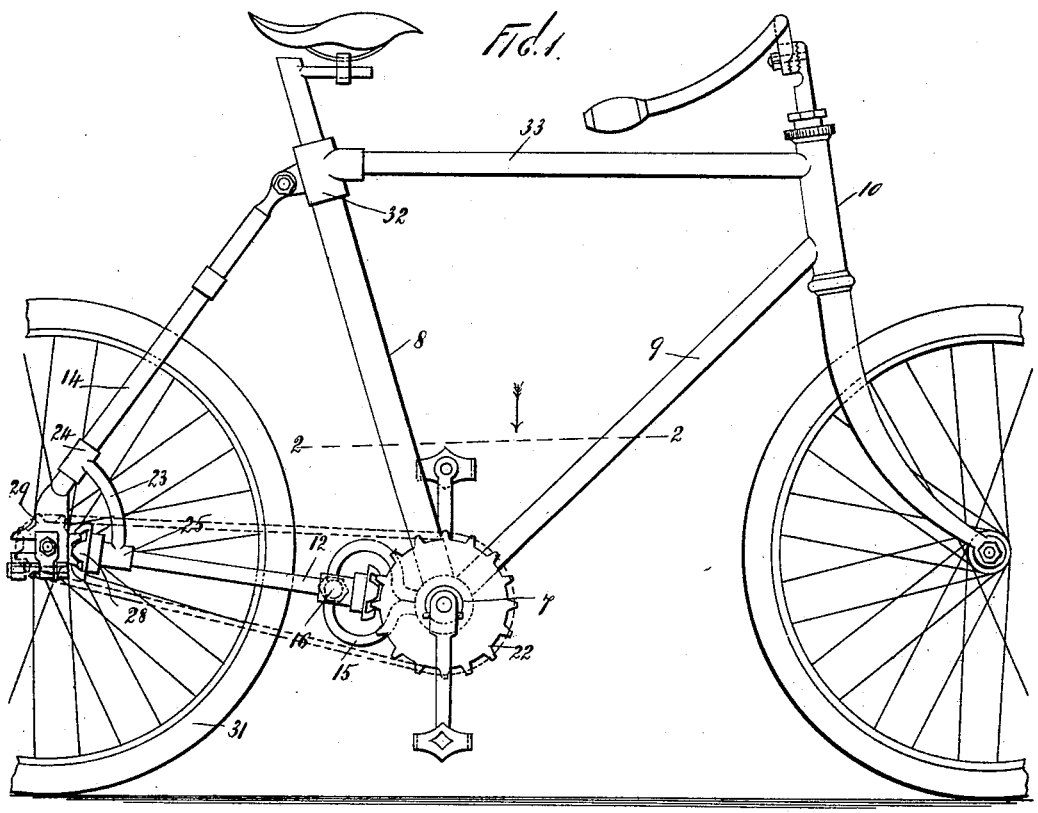
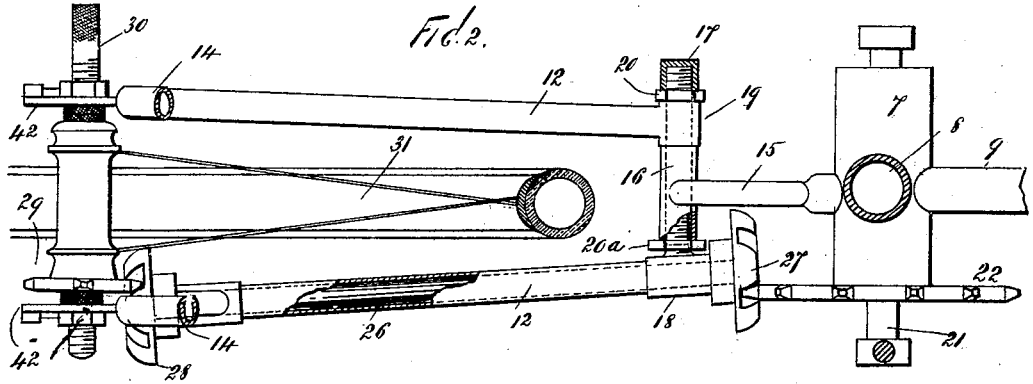
WITNESS
John Buckler,
F. A. Stewart
INVENTOR
Robert H. Hennemeier
ATTORNEYS
THE NORRIS PETERS CO., PHOTO-LITHO., WASHINGTON, D. C.

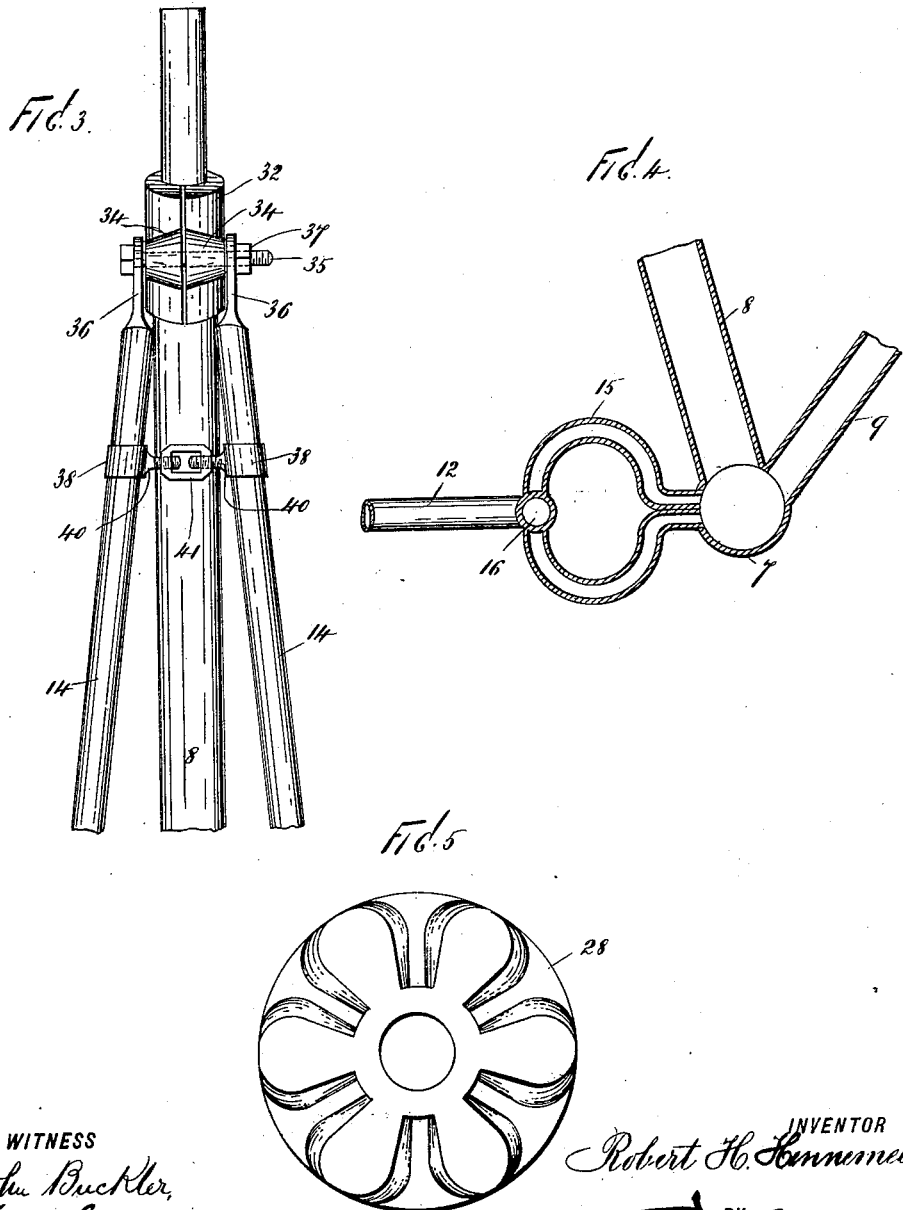

UNITED STATES PATENT OFFICE.

ROBERT H. HENNEMEIER, OF NEW YORK, N. Y.

BICYCLE.

SPECIFICATION forming part of Letters Patent No. 626,756, dated June 13, 1899.

Application filed September 17, 1898. Serial No. 691,141. (No model.)

*To all whom it may concern:*

Be it known that I, ROBERT H. HENNEMEIER, a citizen of the United States, residing at New York, in the county of New York and State of New York, have invented certain new and useful Improvements in Bicycles, of which the following is a full and complete specification, such as will enable those skilled in the art to which it appertains to make and use the same.
This invention relates to bicycles and similar vehicles; and the object thereof is to provide a vehicle of this class with an improved frame and improved chainless propelling mechanism, a further object being to provide a bicycle or similar vehicle with a propelling mechanism which is adapted to operate with or without a chain, as may be desired.

The invention is fully disclosed in the following specification, of which the accompanying drawings form a part, in which—

Figure 1 is a side view of a bicycle provided with my improved propelling mechanism; Fig. 2, a section thereof on the line 2 2 of Fig. 1; Fig. 3, a rear view of a portion of the rear part of the frame; Fig. 4, a central vertical section of that part of the frame in which the pedal-shaft is mounted, and Fig. 5 a face view of a gear-wheel which I employ.

In the drawings forming part of this specification the separate parts of my improvement are designated by the same numerals of reference in each of the views, and in said drawings I have shown a bicycle-frame which is substantially of what is known as the "diamond" form and which employs the usual hub 7, by which the pedal-shaft is supported.

In my improvement the usual tubular rods 8 and 9, which extend, respectively, from the support of the pedal-shaft upwardly to the seat-support and upwardly and forwardly to the tubular head 10 of the frame, are also employed. The lower horizontal rear fork, however, which extends from the support of the pedal-shaft backwardly to the support of the drive-wheel and which consists of the separate tubular rods 12, is of novel construction, as is also the upper fork, which extends upwardly from the support of the drive-wheel to the seat-support and which consists of the separate tubular rods 14. The horizontal fork composed of the tubular rods 12 is also connected with the tubular hub 7 in a novel manner, and for this purpose I connect with the tubular hub 7 an open ring-shaped or circular attachment 15, (clearly shown in Figs. 1, 2, and 4,) and this ring-shaped attachment 15 projects backwardly from the hub 7 and connects with a transverse coupling 16, through which is passed a bolt 17, and one end of this bolt is provided with a sleeve 18, through which one of the rods 12 of the lower horizontal fork passes, and the other rod 12 of said fork is provided with a tubular head 19, through which the opposite end of said bolt passes, and mounted on said end of said bolt is a set-nut 20.

The pedal-shaft 21 is provided at one end with the usual sprocket-wheel 22, and the tubular rod 12 of the lower horizontal fork on the side adjacent to said sprocket-wheel is set at a slight angle, the forward end thereof being inclined inwardly toward the horizontal center of the frame of the vehicle, and the rear end of said tubular rod 12 is connected with a corresponding rod 14 of the upper rear fork by a downwardly-curved arm 23, which is connected with said rod 14 by means of a tubular head 24 and which carries at its lower end a corresponding tubular head 25, through which the rear end of the tubular rod 12 of the lower horizontal fork passes.

Passing through the rod 12 of the lower horizontal fork on the side of the vehicle on which the sprocket-wheel 22 is mounted is a shaft 26, and this shaft carries at its forward end a face-gear wheel 27, which is operated by the sprocket-wheel 22, and said shaft carries at its rear end a corresponding face-gear 28, which operates, in connection with the sprocket-wheel 29, on the hub of the rear or drive wheel 31.

The object of inclining the tubular rod 12 of the lower horizontal fork, in which the shaft 26 is mounted, inwardly, as shown and described, is to bring the sprocket-wheels 22 and 29 in a vertical plane in line with that of the frame, and by means of this construction an ordinary drive-chain may be employed on these sprocket-wheels in the usual manner, and this may be done without interfering in any way with the operation of the chainless gear hereinbefore described, and said chainless gear and the drive-chain or chain-gear may be employed together whenever desired, as indicated in Fig. 1, the chain being shown in dotted lines, or the chainless gear may be employed separately, and by removing the face-gears 27 and 28 the chain-gear may be employed independently of the other, as will be readily understood.

In forming the sprocket-wheels 22 and 29 I prefer to make the same so as to operate as what is known as a "one hundred gear," and this object I accomplish by providing the sprocket-wheel 22 with twenty-five teeth and the wheels 29 with seven teeth, and the face-gears 27 and 28 on the shaft 26 are each provided in this case with five teeth, and by providing the face-gear 28, which operates in connection with the rear sprocket-wheel 29, with an additional tooth the gear may be raised twenty points, and it will therefore be seen that by providing a plurality of the wheels 28, which may be substituted one for another whenever desired, the size of the gear may be increased or decreased as desired, each additional tooth added to the wheel 28 resulting in raising the gear twenty points. The face-gear shown in Fig. 5 is provided with six teeth, and when gears similar to this are used on the shaft a one hundred gear is produced.

The circular attachment 15 permits of the operation of the wheel 27, which may project thereinto or therethrough, and I thus provide means for using a larger gear at the forward end of the shaft 26 than would otherwise be possible and also provide a construction which places the sprocket-wheels 22 and 29 in the same vertical plane as the frame and permits of the use of an ordinary drive-chain thereon.

In order to strengthen the frame and to secure the proper operation of my improved gear, I provide for the adjustment of the forward end of the lower horizontal fork and for bracing the tubular rods 14 of the upper rear fork, and for this purpose the tubular coupling 32, which connects the upper horizontal rod 33 of the frame with the rod 8, is preferably divided longitudinally at its rear side, as shown in Fig. 3, and the separate parts thereof provided with backwardly-directed shoulders or projections 34, through which is passed a bolt 35, and the rods 14 of the upper rear fork are provided with flattened ends 36, through which said bolt is passed, and said bolt is provided at one end with a nut 37. The rods 14 of the rear fork are also connected by tubular sleeves 38, having screw-threaded shanks 40, connected by a turnbuckle 41, and the lower ends of the rods 14 of the upper rear fork, together with the rear ends of the rods 12 of the lower horizontal rear fork, are connected with circular plates or bearings 42, through which the axle or shaft of the rear drive-wheel 31 passes, and said plates or bearings may also be adjusted on said shaft in the usual or any preferred manner.

In order to provide for the adjustment of the forward end of the lower horizontal fork laterally, and the consequent adjustment of the forward end of the shaft 26 toward or from the sprocket-wheel 22, the bolt or pin 17, on which the sleeve 18 is formed, is screw-threaded at both ends, and a set-nut $20^a$ is placed thereon adjacent to said sleeve, and by properly manipulating the nuts 20 and $20^a$ the bolt 17 may be adjusted laterally of the frame and with it the forward end of the lower horizontal fork, and the face-gear 27 may thus be held in proper position relative to the sprocket-wheel 22.

By means of my improved construction I provide for the employment or use of a chainless or chain gear, as may be desired, or for the use of both of said gears together.

My improvement is simple in construction and operation and well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A bicycle constructed as herein described, and provided with the usual pedal-shaft and the usual drive-wheel, sprocket-wheels mounted on the pedal-shaft and on the hub of the drive-wheel, said sprocket-wheels being in a vertical plane parallel with the longitudinal center of the frame of the vehicle, and a shaft mounted between said sprocket-wheels, the front end of which is inclined inwardly toward the longitudinal center of the vehicle, and face-gears connected with the front and rear ends of said shaft, and operating in connection with said sprocket-wheels, substantially as shown and described.

2. A bicycle-frame provided with the usual lower horizontal fork, and the usual tubular hub in which the pedal-shaft is mounted, the forward end of said fork and the said tubular hub being connected by a longitudinal, open, circular, or ring-shaped attachment, and the forward end of said fork being laterally adjustable with reference to said attachment, one side of said fork being provided with a longitudinal shaft having face-gears at each end, and corresponding sprocket-wheels mounted on the hub of the drive-wheel and on the pedal-shaft, substantially as shown and described.

3. A bicycle-frame provided with a tubular hub 7 through which the pedal-shaft passes, and the usual lower horizontal rear fork in which the drive-wheel is mounted, said fork being composed of separate sides connected at their forward ends by a bolt, and said hub and fork being connected by an open or ring-shaped attachment 15, provided with a tubular coupling 16, through which said bolt passes, substantially as shown and described.

4. A bicycle-frame provided with a tubular hub 7 through which the pedal-shaft passes, and the usual lower horizontal rear fork in which the drive-wheel is mounted, said fork being composed of separate sides connected at their forward ends by a bolt, and said hub and fork being connected by an open or ring-shaped attachment 15, provided with a tubular coupling 16, through which said bolt passes, and in which said bolt is adjustable, substantially as shown and described.

5. A bicycle provided with the usual sprocket-wheels on the pedal-shaft and the drive-wheel, said sprocket-wheels being mounted in longitudinal alinement with the frame of the vehicle, and a shaft supported between said sprocket-wheels and provided at each end with a face-gear in connection with which said sprocket-wheels operate, whereby a chainless gear is formed and whereby a drive-chain may be employed in connection with said chainless gear, substantially as shown and described.

In testimony that I claim the foregoing as my invention I have signed my name, in presence of the subscribing witnesses, this 14th day of September, 1898.

ROBERT H. HENNEMEIER.

Witnesses:
F. A. STEWART,
C. C. OLSEN.